April 19, 1927.

D. C. MULVIHILL 1,625,137

WHEEL CLEANING DEVICE

Filed Jan. 19, 1925     4 Sheets-Sheet 4

Inventor:
Daniel C. Mulvihill
By
Gillson, Mann & Cox
Attys.

Patented Apr. 19, 1927.

1,625,137

UNITED STATES PATENT OFFICE.

DANIEL C. MULVIHILL, OF HANNIBAL, MISSOURI.

WHEEL-CLEANING DEVICE.

Application filed January 19, 1925. Serial No. 3,348.

This invention relates to car wheel cleaning and finishing devices.

One of the objects of the invention is the provision of new and improved means for removing sand and other foreign matter adhering to the sides of the wheel, after the same has been cast.

Another object of the invention is the provision of new and improved mechanism for simultaneously mechanically removing from both sides of the wheel foreign matter adhering thereto.

A still further object of the invention is the provision of new and improved means for grinding the hubs and flanges of car wheels.

Other objects of the invention are the provision of new and improved wheel cleaning and flange and hub grinding or facing mechanism that is simple in construction, cheap to manufacture, efficient in operation, composed of few moving parts, and that is not likely to become broken or get out of order.

In the accompanying drawings illustrating the invention—

Figure 1:
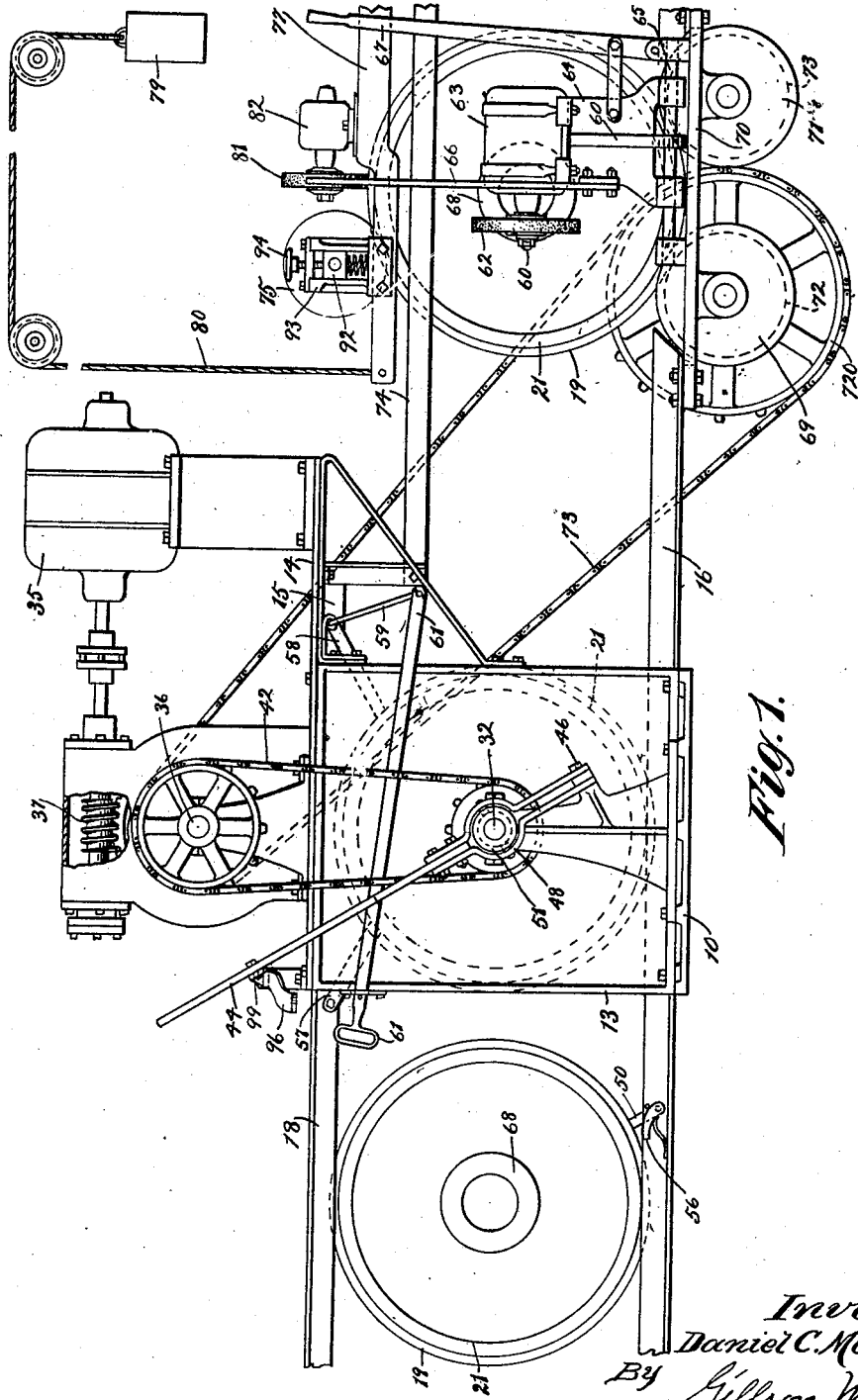
Fig. 1 is a side elevation of the device.

In the casting of car wheels, sand and other foreign matter will adhere to the surface of the wheels, and owing to the configuration of the sides of the wheel the same is difficult to remove. Means for mechanically accomplishing this purpose constitutes a part of the subject-matter of this invention.

In the form of the device selected to illustrate one embodiment of the invention the reference character 10 designates the base on which a frame 11 of the brushing mechanism is mounted. The frame of the brushing mechanism comprises the upright supports 12 and 13 spaced apart and secured in spaced relation by the frame member 14.

In order to expedite the movements of the wheels to operating position, and their removal therefrom, the base 10 and the frame member 14 are provided with tracks 15 and 16. Each of these tracks is formed by two angle bars 17 and 18 spaced apart a sufficient distance to engage the flange 19 of the wheel 21. These tracks extend in front and at the rear of the frame 11 and preferably are inclined slightly downward at their rear ends, whereby the wheels will move by gravity along the same. The upper track 15 will be considered as a guide for the upper portion of the wheel.

Figure 5:
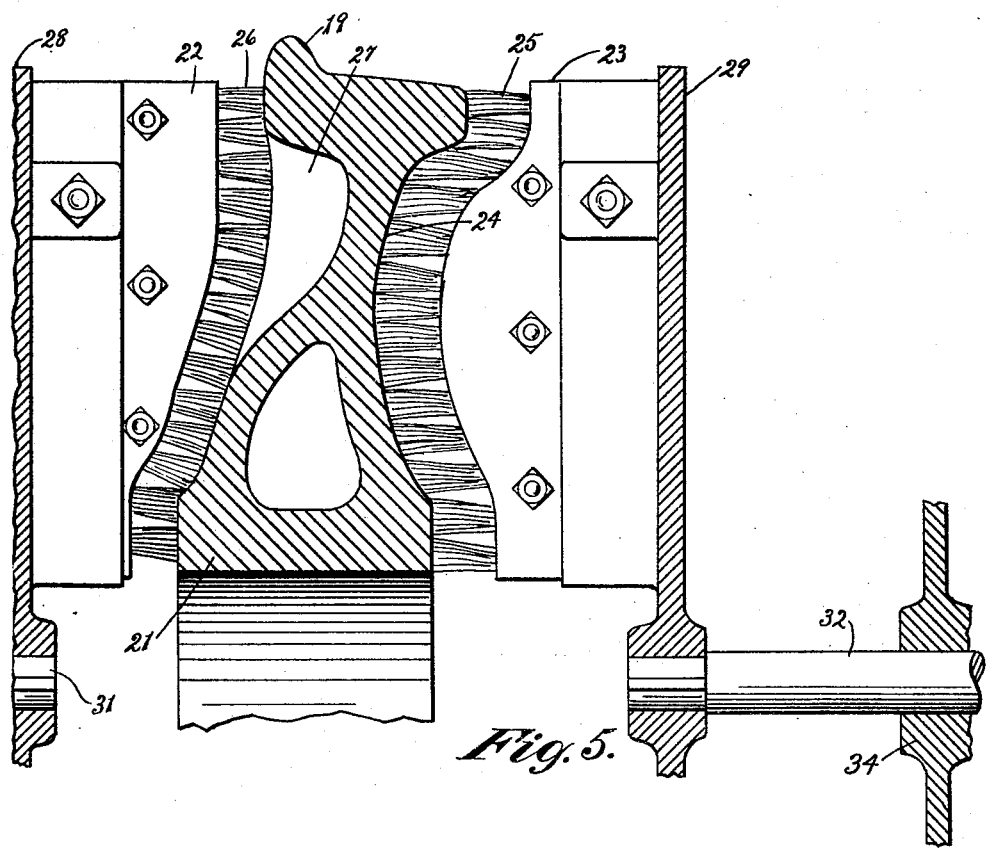
Fig. 5 is a vertical section of a portion of a wheel, showing the brushes in engagement therewith.

Suitable mechanism is provided for mechanically brushing the wheel on one or both sides. In the form of the device shown on the drawing two sets of movable brushes 22 and 23 are employed, one set at each side of the wheel. Each brush is so constructed that it substantially conforms to the contour of the side of the wheel upon which the same is mounted. Where the outer surface of the wheel is concave as shown at 24 in Fig. 5 the wheel engaging ends of the wire bristles 25 of the brush 23 are correspondingly convex. Likewise, the bristles 26 of the brush 22 conform to the outer surface of the webs 27 of the wheel. The brushes 22 and 23 are mounted on plates 28 and 29 which are rigidly connected to the inner ends of the shafts 31 and 32, respectively. These shafts are slidably mounted in bearings 33 and 34 carried by the frame 11.

Suitable means are provided for rotating the shafts 31 and 32. As shown, a motor 35 mounted on the frame 11 is geared to the power shaft 36 by worm drive as at 37. Drive wheels 38 and 39 keyed to the shafts 31 and 32 respectively are driven from the power shaft 36 through the flexible drives 41 and 42.

Means are provided for moving the brushes 22 and 23 simultaneously into engagement with the sides of the wheel. Any suitable means may be employed for this purpose. As shown, levers 43 and 44 pivoted as at 45 and 46 to the frame 11 are provided with yoke and trunnion 47 and 48 for engaging grooved rotating members 49 and 51 fixed on the shafts 31 and 32 respectively. In order that the movement of one lever will cause a corresponding movement of the other lever for simultaneously moving the brushes toward or from each other, the following mechanism is employed.

A lever 96 is pivoted to the frame 11, as at 97. Links 98 and 99 are pivoted to the levers 43 and 44, respectively, at their outer ends, and to the lever 96 at each side of the pivot 97, as at 100, 101, respectively. The free end of the lever is offset downwardly whereby access may be had to the same below the link 98. The lever 96 is also offset edgewise (see Fig. 1), whereby the same may be turned 180 degrees to the other dead center position or slightly past dead center, whereby the same will be locked in operative position. The links 98 and 99 may be provided with additional apertures 102, 103, for adjustably connecting the same to the levers 44 and 43, respectively, for adjusting the brushes relatively to the wheel.

It is necessary that means be provided for holding the wheel 21 in position during the brushing operation. One manner of accomplishing this is shown in Fig. 1. At the front of the machine, or on the side on which the wheel enters the same, a latch 57 is pivotally connected to the frame 11 and is adapted to be forced upwardly by the wheel as it rolls beneath the same, and when the wheel passes beneath the same to position to be operated upon the latch 57 will engage the periphery of the wheel and prevent the same from moving backward. A similar latch 58 is mounted at the rear end of the frame, and the same is adapted to engage the periphery or tread portion of the wheel for preventing the forward movement of the wheel. The latch 58 is provided with a rigid extension or bell crank 59, to which a pull rod 61 is pivotally connected. When the wheel 21 rolls beneath the latch 57 it will come in contact with the latch 58, which will prevent its further movement until the pull rod 61 is moved forward for elevating the latch 58 to permit the wheel to pass beneath the same.

In the operation of the device the wheels are placed in the forward end of the track, and roll by gravity along the same into engagement with a stop 50, which is provided with a spring-pressed releasing arm 56. When it is desired to place a wheel in position to be operated upon, the arm 56 is depressed by the foot of the operator and the wheel 21 is permitted to roll by gravity into a position where it is held by the latches 57, 58. The following or succeeding wheel will be held by the latch 50 until, in its turn, it is permitted to roll into position to be brushed. The lever 43 or 44 is moved inwardly, which movement through the racks 53 and 54, and the gear 52, will cause a corresponding inward movement of the other lever, thereby moving the brushes 22, 23, into engagement with the sides of the wheel. The brushes being rotated by the motor will clean the surface of the wheel in a comparatively few revolutions. When the wheel has been sufficiently cleaned the operator moves the pull rod 61 forwardly, which releases the wheel and permits the same to roll rearwardly along the tracks.

Figure 2:
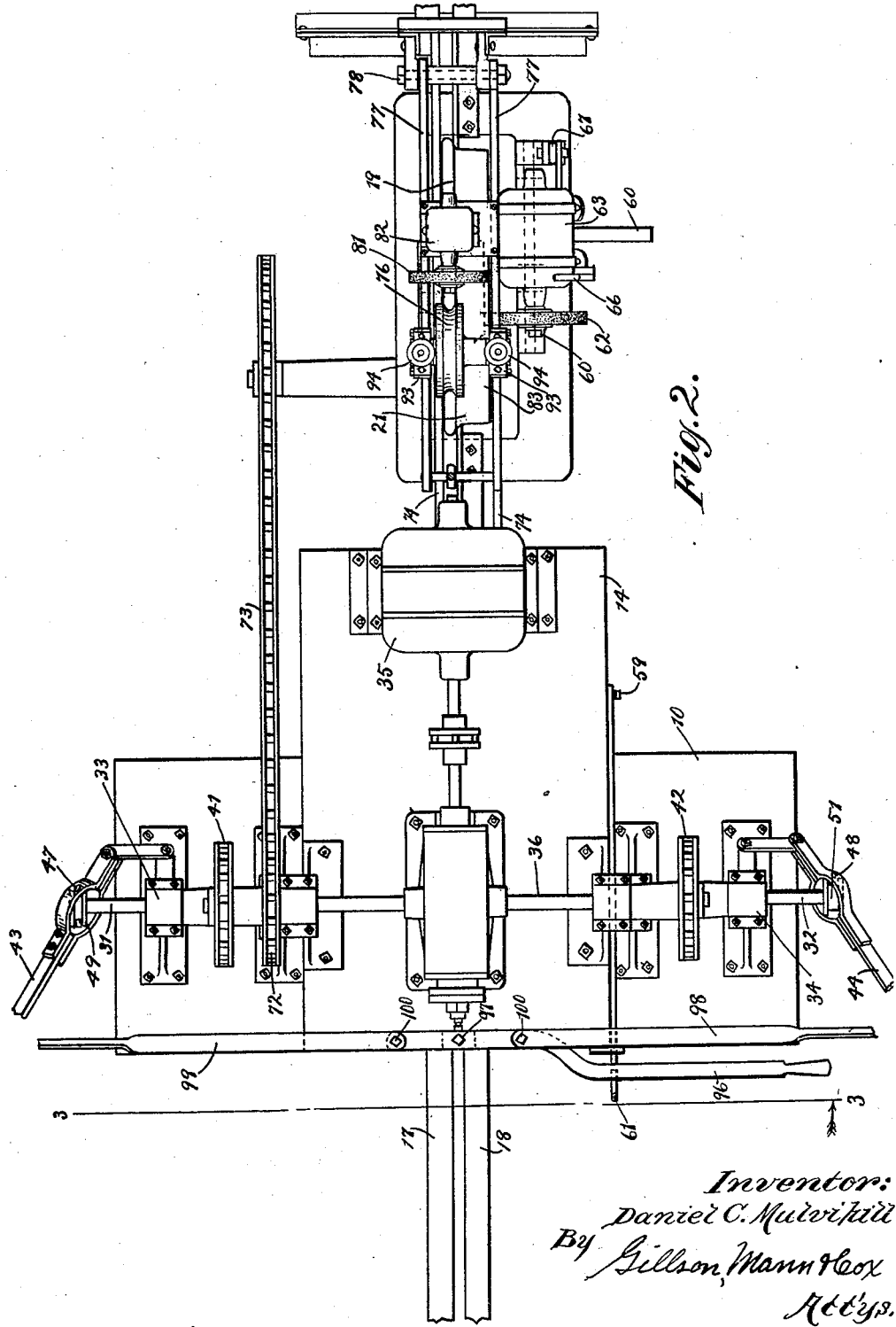
Fig. 2 is a plan view thereof.
Figure 3:
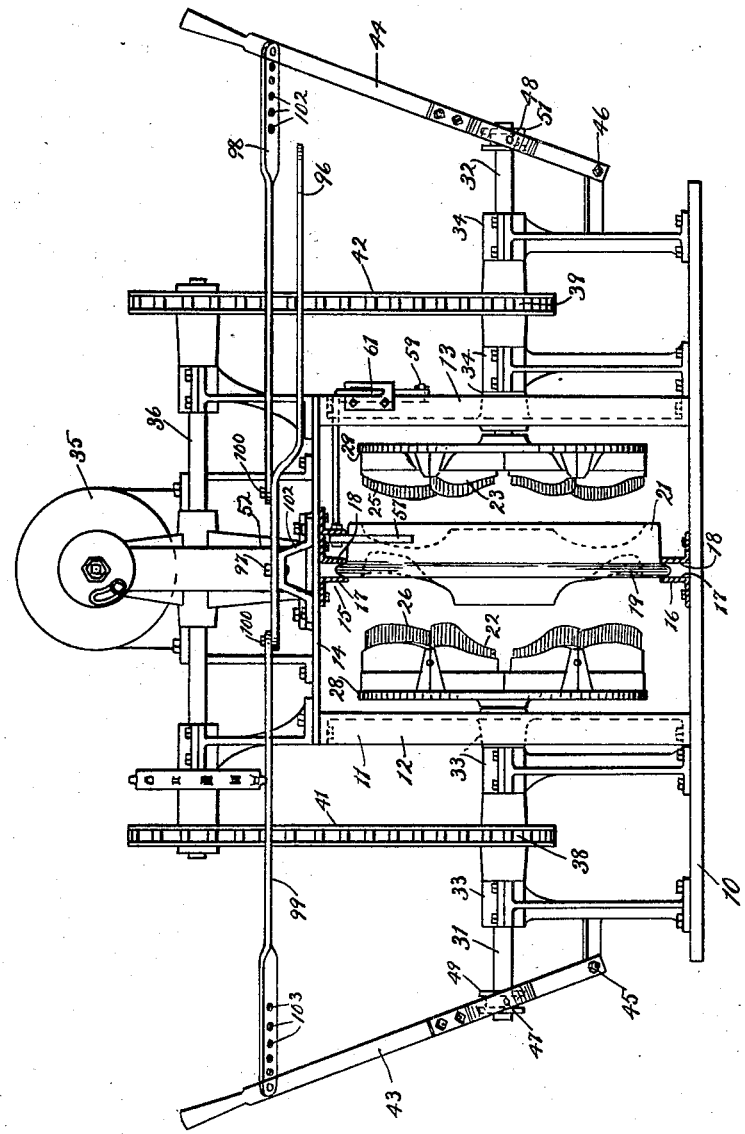
Fig. 3 is a section on line 3—3 of Fig. 2.

Suitable mechanism is mounted adjacent to the tracks in rear of the frame 11 for rough grinding or facing the inner end of the hub 68 of the wheel 21. As shown, this means comprises a rotating grinder 62, which is rotated by a suitable motor 63 carried by a frame 64. The grinder may be, and preferably is, mounted on the armature shaft 60, as shown in Fig. 2. The frame 64 is pivotally and slidably mounted on a rod 65, secured adjacent to the lower track 16. The rod 65 is located inwardly of the center of gravity of the motor 63, whereby gravity will tend to hold the grinder 62 out of contact with the wheel. The frame 64 is provided with a curved leg 60, the lower end of which is adapted to engage the frame member 70 for limiting the outward movement of said frame. The frame 64 is moved inwardly to bring the grinder 62 into engagement with the hub of the wheel by any suitable means, as the lever 66 rigidly secured to said frame. The frame is moved longitudinally of the rod by means of the lever 67. In the operation of the device the levers 66, 67, are grasped by the hands of the operator and are suitably operated to cause the grinder 62 to engage all surfaces of the end of the hub 68 of the wheel 21.

Suitable means are provided for causing the wheel to rotate in order to insure even grinding of the end of the hub. Means are also provided for guiding the wheel during its rotation. As shown in Figs. 1 and 2 of the drawing, the means for rotating the wheel comprises a plurality of rollers 69, 71, having peripheral grooves 72, 73, in alignment with the lower track 16 for engaging the flange 19 of the wheel. In order to insure uniform grinding of the hub means are provided for rotating the rollers 69, 71. As shown, the roller 69 is rotated by means of a sprocket 720, which is operated from the power shaft 36 by the flexible drive 73. The parts are so arranged that the roller 69 rotates at greatly reduced speed over the power shaft 36, whereby the wheel 21 will be slowly rotated. Guide bars 74 are provided for guiding the upper portion of the wheel while it is traveling along the track 16 on to the rollers 69, 71.

Suitable means are provided for guiding the upper surface of the wheel during its rotation. As shown, a roller 75, having a peripheral groove 76 for engaging the flange 19, is employed for this purpose. The roller 75 is journaled in blocks 92 slidably mounted in a pair of slotted plates 93, secured to the lever or lever arms 77. The blocks 92 are adapted to be adjusted along the plates 93 by means of screws 94 that engage their upper surface. Springs 95 are adapted to hold the blocks upwardly against the ends of the screws 94. The arms 77 are in parallel relation and are pivoted as at 78. A counterweight 79 is adapted to be attached to the free end of the lever arms 77, as by means of the flexible member 80. The parts are so constructed and arranged that the lever or lever arms 77 will be held in either its operative or inoperative position.

Suitable means are provided for grinding the flange 19 of the wheel for removing projections and smoothing the periphery of the flange during the hub grinding operation. As shown, this is accomplished by means of a grinder 81, rotated transversely to the flange 19 by a motor 82 mounted on the lever 77. The roller 75 constitutes a guide and gage for the grinder 81. As the grinder wears away, or if it is desirable to grind more material from the flange, the lever arm 77 is lowered by adjusting the blocks 92 by means of the screws 94.

Figure 4:
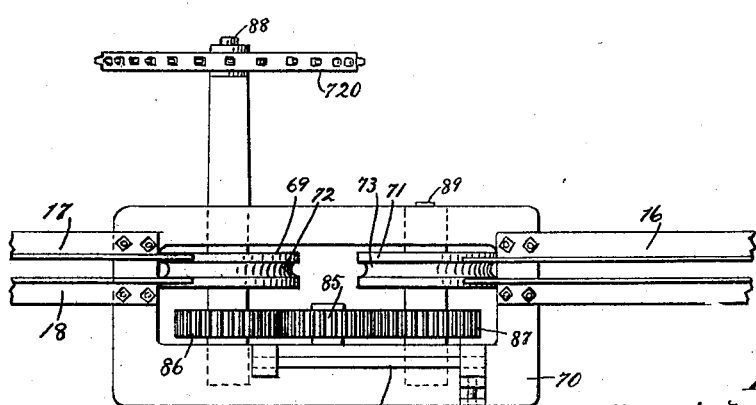
Fig. 4 is a plan view of the wheel rotating device, showing a modified form of construction.

In Fig. 4 is shown a modified form of mechanism for rotating the wheel. In this form of the device the wheel supporting rollers 69, 71, are both positively rotated by providing an idler gear 85 for engaging the corresponding gears 86, 87, on the shafts 88, 89, respectively, of the rollers 69, 71. The idler gear is provided for causing the rollers 69, 71, to turn in the same direction, whereby both will tend to rotate the wheel during the operation of the device.

In the operation of the device the wheels are placed on the track 16 at the front of the machine with the flange engaging the upper track for holding the wheel in upright position. The wheels roll by gravity along the tracks into engagement with the stop 50, from which, by manipulating the stop, they are admitted as required to the brushing station, where they are cleaned by the brushing operation. After the cleaning operation the latch 58 is elevated, which permits the wheel to roll on to the rollers 69, 71, which constitute the grinding station, where the hub and flange are properly ground. After this grinding operation the lever 77 is elevated and the wheel is pushed over the roller 71 on to the track 16, which conducts it away from the machine.

While I have disclosed my device as being operated by electric motors, it is evident the same may be operated by any convenient or suitable power mechanism.

It is thought from the foregoing, taken in connection with the accompanying drawings, that the construction and operation of my device will be apparent to those skilled in the art, and that various changes in size, shape, proportion and details of construction may be made without departing from the spirit and scope of the appended claims.

I claim as my invention:—

1. In combination, a frame, a pair of tracks for engaging the flange of a car wheel at its upper and lower portions for guiding the wheel in its rolling movement along said tracks and for supporting the same in upright position, means for holding said wheel in a predetermined position on said tracks, brushes movably mounted on said frame at each side of said tracks, means for simultaneously moving said brushes to and from said wheel, and means for operating said brushes.

2. In combination, a supporting frame, a pair of wheel brushing devices mounted on said frame and movable toward and from each other, a pair of inclined tracks for conducting a wheel by gravity to and from said frame, latch mechanism for holding said wheel in a predetermined position on said tracks, means for operating said latch mechanism, a lever at each side of said frame, means connecting said levers for simultaneously moving said devices into contact with the sides of said wheel, and means for operating said devices for simultaneously cleaning both sides of said wheel.

3. In combination, a pair of tracks for engaging the flange of a car wheel for holding the same in upright position, latch means for holding said wheel in non-rotatable position on said tracks, a rotating brush at each side of said track for engaging the inner and outer faces of a car wheel, means for moving said brushes to and from each other, and means for rotating said brushes.

4. In combination, means for holding a car wheel, an inclined track for guiding said wheel to said means, a latch normally in operative position for holding said wheel on said track in a predetermined position to be operated upon, whereby said wheel will roll along said track when said latch is released, a brush for cleaning one side of said wheel, means for moving said brush laterally, and means for operating said brush.

5. In a wheel cleaning device, a pair of inclined tracks for engaging the flange of a car wheel at its upper and lower portions for holding the same in upright position and for guiding the same as it rolls along said tracks, a pair of brushes for cleaning said wheel, means for simultaneously moving said brushes toward and from each other, and means for simultaneously rotating said brushes.

6. In combination, a frame, a pair of tracks on said frame for engaging the flange of a car wheel for holding the same in upright position, a set of brushes at each side of said track, means including slidable and rotatable shafts for moving said brushes toward each other and for rotating the same, a motor, a power shaft extending transversely to said tracks, and operated by said motor, a pulley on said shaft at each side of said tracks, and gearing between said pulleys and said first named shafts and latching means for holding said wheel in position during the brushing operation.

7. In combination, a pair of inclined tracks for engaging the upper and lower peripheral portions of a car wheel for holding the same in upright position and permitting the same to roll by gravity along said track, a station along said track, means for holding said wheel at said station, without removing said wheel from said tracks, brushes at said station for cleaning each side of said wheel, means for simultaneously adjusting said brushes to and from said wheel, means to operate said brushes, and means for releasing said wheel from said station to permit said wheel to roll along said track.

In testimony whereof I affix my signature.

DANIEL C. MULVIHILL.